(12) United States Patent
Merio et al.

(10) Patent No.: US 8,559,421 B2
(45) Date of Patent: Oct. 15, 2013

(54) METHOD AND APPARATUS FOR CALIBRATING SLEEP CLOCKS

(75) Inventors: Tomi Ville Merio, Salo (FI); Ilari Hannes Nummila, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 33 days.

(21) Appl. No.: 13/310,046

(22) Filed: Dec. 2, 2011

(65) Prior Publication Data

US 2012/0294212 A1 Nov. 22, 2012

Related U.S. Application Data

(63) Continuation of application No. 13/112,039, filed on May 20, 2011, now abandoned.

(30) Foreign Application Priority Data

May 20, 2011 (GB) .................................. 1108512.3
Nov. 29, 2011 (GB) .................................. 1120543.2

(51) Int. Cl.
*H04W 52/02* (2009.01)

(52) U.S. Cl.
USPC ........................................................ 370/352

(58) Field of Classification Search
USPC ........................................................ 370/352
See application file for complete search history.

(56) References Cited

U.S. PATENT DOCUMENTS

| 6,473,607 | B1 | 10/2002 | Shohara et al. |
| 6,725,067 | B1 | 4/2004 | Marx et al. .................... 455/574 |
| 2006/0205382 | A1 | 9/2006 | Wang et al. ................ 455/343.1 |
| 2007/0105525 | A1 | 5/2007 | Wang et al. ................ 455/343.1 |
| 2007/0213028 | A1* | 9/2007 | Shohara et al. ............ 455/343.1 |
| 2010/0029267 | A1* | 2/2010 | Yang et al. .................... 455/425 |

FOREIGN PATENT DOCUMENTS

| CN | 1 777 310 A | 5/2006 |
| GB | 2 393 610 A | 3/2004 |
| WO | WO 2011/113377 A2 | 9/2011 |

OTHER PUBLICATIONS

PCT International Search Report and the Written Opinion mailed Aug. 29, 2012 issued in related International Application PCT/IB2012/052494 by the International Searching Authority (12 pages).
UKIPO Combined Search and Examination Report under Section 17 and 18(3) dated Jul. 25, 2012 which is issued in a related British Application No. GB1206996.9 (4 pages).

(Continued)

*Primary Examiner* — Sulaiman Nooristany
(74) *Attorney, Agent, or Firm* — Lucas & Mercanti, LLP; Robert P. Michal (57) ABSTRACT

Apparatus for use in a wireless network has a fast clock for operation in an active wakeup mode and a sleep clock for operation in a sleep mode. A calibration for the sleep clock is calculated based on the fast clock. A quality value for that new calibration is determined. If the quality value of the new calibration is higher than a quality value of an old calibration, the new calibration is used, and, if not, the new calibration is discarded and the old calibration is used. Alternatively or in addition, the length of time until the next calibration is estimated. It is then determined whether the new calibration is of sufficient quality to last for the estimated time until next calibration, and, if not, the calibration measurement period is extended.

20 Claims, 4 Drawing Sheets

(56) References Cited

OTHER PUBLICATIONS

UKIPO Combined Search and Examination Report under Section 17 and 18(3) dated Feb. 17, 2012 which is issued in a related British Application No. GB1120543.2 (6 pages).

Patents Act 1977: Examination Report under Section 18(3) dated Mar. 28, 2013 which was issued by UK Intellectual Property Office in connection with a related British application No. GB1120543.2 (3 pages).

* cited by examiner

METHOD AND APPARATUS FOR CALIBRATING SLEEP CLOCKS

CROSS REFERENCE TO RELATED APPLICATION

This application is a Continuation of U.S. patent application Ser. No. 13/112,039 filed May 20, 2011, which claims benefit under 35 U.S.C. §119(a) and 37 CFR 1.55 to UK Patent Application Nos. 1108512.3, filed on May 20, 2011 and 1120543.2, filed on Nov. 29, 2011, the entire contents of each of which are hereby incorporated by reference.

TECHNICAL FIELD

The present invention relates to methods and apparatus for calibrating sleep clocks. In particular, but not exclusively, this application relates to methods and apparatus for calibrating sleep clocks in mobile communications systems.

BACKGROUND

As part of the ongoing evolution of wireless communications systems and terminals, power consumption has always been of major concern. It is important to conserve the battery life for as long as possible and one way of doing this is to set a device into "sleep mode" whenever it is not being actively used by a user or a system. In such a sleep mode, some of the circuitry is deactivated in order to save energy. In a sleep mode, many of the hardware components are run by low power, slower "sleep" clocks instead of fast clocks, which are required when the device is active or "awake". However, to keep the overall cost of a device low, sleep clocks are often manufactured from relatively inexpensive parts and thus tend to show a larger frequency drift than their faster counterparts. Such a frequency drift could potentially cause different circuit components to be out of sync with each other and thus render communication between the two impossible. Moreover, temperature changes can affect the amount of frequency drift. To overcome problems of frequency drift, the sleep clock needs to be calibrated and corrected repeatedly to keep it somewhat in line with the rest of the circuitry.

In one prior art technique, calibration of the sleep clock is performed every time the device is in an active or awake mode. The calibration measurements take place over the whole period that the device is in the awake mode. During such awake modes, the fast clock and the slow clock are both running simultaneously, thus allowing comparison between the two clocks. When the device then goes into sleep mode, the calibration for the sleep clock is used. However, if the device is not in the awake mode for long enough, the new calibration may not be good enough to ensure proper operation.

In another prior art technique, calibration of the sleep clock is performed whenever required through a forced calibration. Such forced calibrations require the device to be put into awake mode simply to perform another calibration and this therefore consumes extra energy simply to achieve calibration.

In a further prior art technique, estimates of the sleep clock frequency are made by comparing the sleep clock frequency to the fast clock frequency while in an awake mode (prior to entering a sleep mode), and then correcting for frequency drift of the sleep clock frequency while the device is in sleep mode by using the timing drift of the first arriving path at wakeup.

SUMMARY

In a first exemplary embodiment of the present invention, there is provided apparatus for use in a wireless network, the apparatus being associated with a fast clock for operation in an active wakeup mode and a sleep clock for operation in a sleep mode, the apparatus comprising at least one controller configured to: calculate a calibration for the sleep clock based on the fast clock; determine a quality value for that new calibration; estimate the length of time until the next calibration; and determine whether the new calibration is of sufficient quality to last for the estimated time until next calibration, and, if not, extend the calibration measurement period.

In a second exemplary embodiment of the present invention, there is provided apparatus for use in a wireless network, the apparatus being associated with a fast clock for operation in an active wakeup mode and a sleep clock for operation in a sleep mode, the apparatus comprising at least one controller configured to: calculate a calibration for the sleep clock based on the fast clock; determine a quality value for that new calibration; determine whether the quality value of the new calibration is higher than a quality value of an old calibration; and, if so, use the new calibration and, if not, discard the new calibration and use the old calibration.

In a third exemplary embodiment of the present invention, there is provided a method for use in a network apparatus associated with a fast clock for operation in an active wakeup mode and a sleep clock for operation in a sleep mode, the method comprising: calculating a calibration for the sleep clock based on the fast clock; determining a quality value for that new calibration; estimating the length of time until the next calibration; determining whether the new calibration is of sufficient quality to last for the estimated time until next calibration, and, if not, extending the calibration measurement period.

In a fourth exemplary embodiment of the present invention, there is provided a method for use in a network apparatus associated with a fast clock for operation in an active wakeup mode and a sleep clock for operation in a sleep mode, the method comprising: calculating a calibration for the sleep clock based on the fast clock; determining a quality value for that new calibration; determining whether the quality value of the new calibration is higher than a quality value of an old calibration; and, if so, using the new calibration and, if not, discarding the new calibration and using the old calibration.

Further features and advantages of the invention will become apparent from the following description of preferred embodiments of the invention, given by way of example only, which is made with reference to the accompanying drawings.

DETAILED DESCRIPTION

Aspects of the first exemplary embodiment help improve the quality of the calibration so that it is more likely to be of sufficient quality to last until the next calibration event. This helps reduce the need for additional forced calibrations, which consume extra energy.

In an embodiment, the controller is configured to determine whether the quality value of the new calibration is higher than the quality value of an old calibration and, if so, use the new calibration and, if not, discard the new calibration and use the old calibration. This has the benefit that a new calibration is not used instead of an older calibration that is better.

Aspects of the second exemplary embodiment prevent an old calibration being discarded in place of a new calibration that is of a lower quality than the old one. This has particular advantage in that there can be situations where a longer calibration measurement is done first and then soon afterwards a shorter calibration measurement is done. If the time between these calibrations is short, then any temperature change does not affect the calibration value much. In such a case, the first measurement can be more accurate than the second one.

In an embodiment according to either exemplary embodiment, the controller is configured to calculate the quality of a calibration by estimating how long the calibration is valid. This has the benefit that the quality value is in units of time, and thus the quality value can be directly compared to the time until next calibration.

In an embodiment according to either exemplary embodiment, the controller is configured to estimate how long a calibration will be valid based on the error allowed before a new calibration must be made and the length of the calibration measurement period. This may also take into account any calibration phase error.

In an embodiment according to either exemplary embodiment, the controller is configured to estimate how long a calibration will be valid based on an error caused by temperature drift. Temperature drift, particularly of the slow clock, can be a significant contributor to loss of quality of the calibration.

In an embodiment according to either exemplary embodiment, the controller is configured to estimate how long a calibration will be valid based on an estimate of the length of time that the fast clock will not be running.

In an embodiment according to either exemplary embodiment, the controller is configured to estimate the length of time that the fast clock will not be running based on the previous estimated time that the fast clock would not be running and the actual time that the fast clock was not running. In a specific example, this enables the controller to determine whether the periods in which the device is in a sleep mode are roughly constant, or whether they are changing (perhaps significantly), and will be able to make estimates of the sleep period accordingly.

In an embodiment according to either exemplary embodiment, the controller is configured to force a new calibration to be carried out if the current time equals or is larger than the time when the calibration is no longer acceptable.

In one embodiment according to either exemplary embodiment, the controller is further configured to estimate the interval of time that the fast clock is not running (i.e. the period of time in which the device is in a power-saving mode between two awake mode periods). It is then configured to establish whether the new quality value is sufficient to last for the estimated time until next calibration. If not, the controller is configured to extend the duration of the calibration measurement. Such an apparatus has the benefit that a calibration that is not good enough to last until the predicted next calibration time is not used. This leads to better timing, which in turn, leads to better performance of the apparatus. Also, by extending the calibration measurement period, the quality of the calibration increases, which reduces the number of forced calibrations, and in turn, leads to lower power consumption.

In an embodiment, the apparatus is provided as a chipset.

There is also provided a mobile communications terminal comprising apparatus as described above.

There is also provided a computer program comprising code such that when the computer program is executed on a computing device, the computing device is arranged to carry out a method as described above. The computer program may be stored in a non-transitory computer-readable storage medium.

The following abbreviations may be found in the specification and/or the drawings:

E Allowed calibration error (fast clock cycles)
Emax Maximum allowed calibration error (fast clock cycles)
Ep Phase error (fast clock cycles)
Etemp Maximum temperature induced frequency drift error (fast clock cycles/s)
EUTRAN Evolved Universal Terrestrial Radio Access Network
Qcal Quality value/length of time that a calibration will remain acceptable (seconds)
Qt Time when a new calibration must be made (seconds)
T Time when a new calibration has been calculated (seconds)
Tcal Duration of calibration measurements (seconds)
Tprev Previous estimated length of time when fast clock was not running (seconds)
Treal Previous length of time that fast clock was not running (seconds)
Tsleep Estimated length of time that fast clock will not be running (seconds)

"Wireless devices" as used herein include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

When referred to hereafter, the terminology "base station" includes but is not limited to a Node-B, a site controller, an access point (AP), or any other type of interfacing device capable of operating in a wireless environment. In one embodiment, the base station is comprised within a mobile station serving as a connection point to other mobile stations and/or base stations.

Figure 1A:
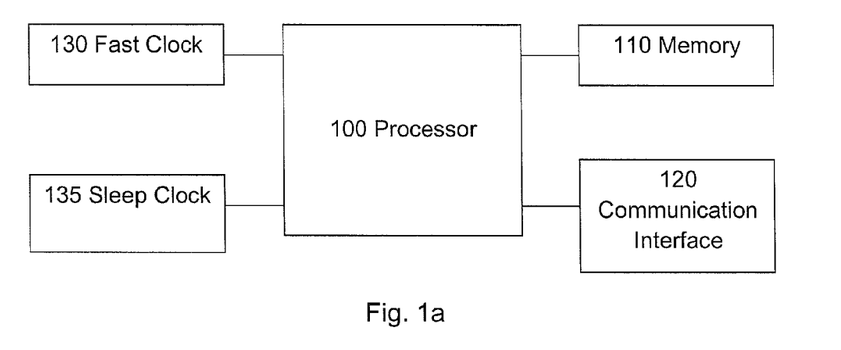
FIG. 1a shows a block diagram illustrating schematically an example of an apparatus according to embodiments discussed herein.

FIG. 1a shows a block diagram illustrating schematically an example of an apparatus according to an embodiment. The apparatus comprises at least one controller 100, such as a processor, a memory 110 and a communication interface 120. In memory 110, computer instructions are stored which are adapted to be executed on the processor 100. Communication interface 120 is adapted to receive and send information to and from the processor 100. The apparatus as a whole or individual parts of the apparatus may be provided by one or more computer chips, including for example an Application-Specific Integrated Circuit (ASIC), an Integrated Chip (IC) or other chips.

The apparatus is associated with a fast clock 130 and a sleep clock 135 and is adapted to operate using the fast clock 130 in an active mode and to operate using the sleep clock 135 in a power-saving mode. The sleep clock is used as a reference clock for other hardware when the apparatus is in the power-saving mode and the fast clock is "off" or inactive. The fast clock may be a radio frequency (RF) clock or a Phase Locked Loop (PLL) clock. Examples of power-saving modes include sleep modes, deep sleep modes, idle modes, discontinuous reception modes and discontinuous transmission modes. The fast clock is faster than the sleep clock and, in one specific example, the fast clock has a frequency of about 40 MHz and the sleep clock is several orders of magnitude slower, for example at around 30 kHz.

In one embodiment, the controller 100 comprises a computer chip or chipset which is provided in a base station. In an alternative embodiment, the controller 100 comprises a computer chip or chipset which is provided in a mobile communication terminal, such as a mobile station, a mobile telephone or a mobile modem, or some other wireless device.

Figure 1B:
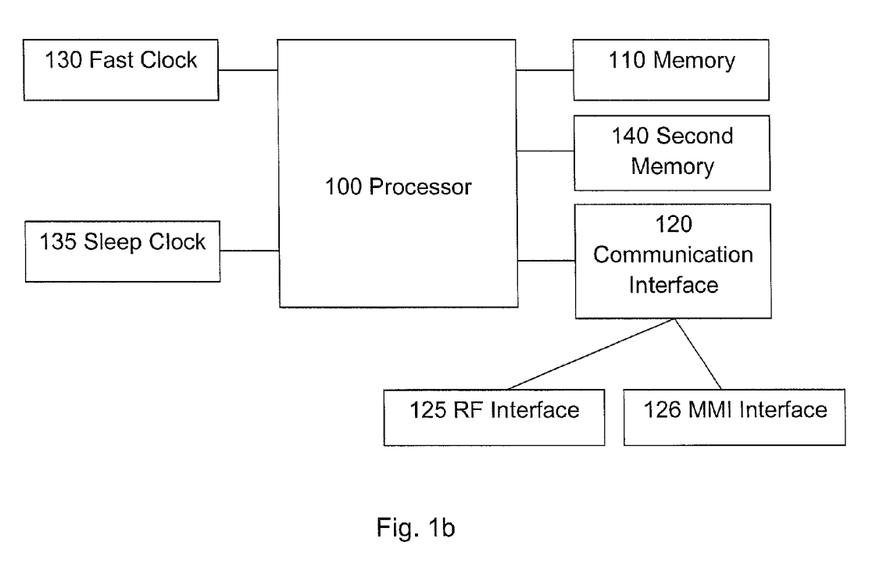
FIG. 1b shows a block diagram illustrating schematically an example of an apparatus according to embodiments discussed herein.

FIG. 1b shows a block diagram illustrating schematically another example of an apparatus according to an embodiment. In one example, the apparatus comprises a wireless device generally, or a mobile station or node, user equipment, cellular phone, a mobile terminal, etc. in particular. The apparatus comprises at least one controller 100, such as a processor, a memory 110 and a communication interface 120. In the memory 110, computer instructions are stored which are adapted to be executed by processor 100. The communication interface 120 is adapted to receive and send information to and from the processor 100. The communication interface 120 further comprises a radio frequency interface 125 for communicating with other apparatus and an (optional) man-machine interface (MMI) 126 for communicating between the apparatus and a user. The MMI 126 may be provided by a second apparatus. For example, the first apparatus may be a dongle and the MMI 126 may be a computer, such as a laptop, to which the dongle is connected. Such an MMI may include a touch pad, a display, a keypad, audio in and output and/or a touch display. The apparatus is adapted to operate using a fast clock 130 in an active mode and to operate using a slower sleep clock 135 in a power-saving mode. Such power-saving modes may again include sleep modes, deep sleep modes, idle modes, discontinuous reception modes and discontinuous transmission modes.

The mobile station of this example further comprises a second memory 140 which comprises one or more user applications such as a message handling application, a voice call handling application, a text editor, an interne browser application and drivers for further devices to be connected to or incorporated in the apparatus, such as a camera module. In one embodiment, the first and second memories 110,140 are incorporated within the same memory module.

Figure 1C:
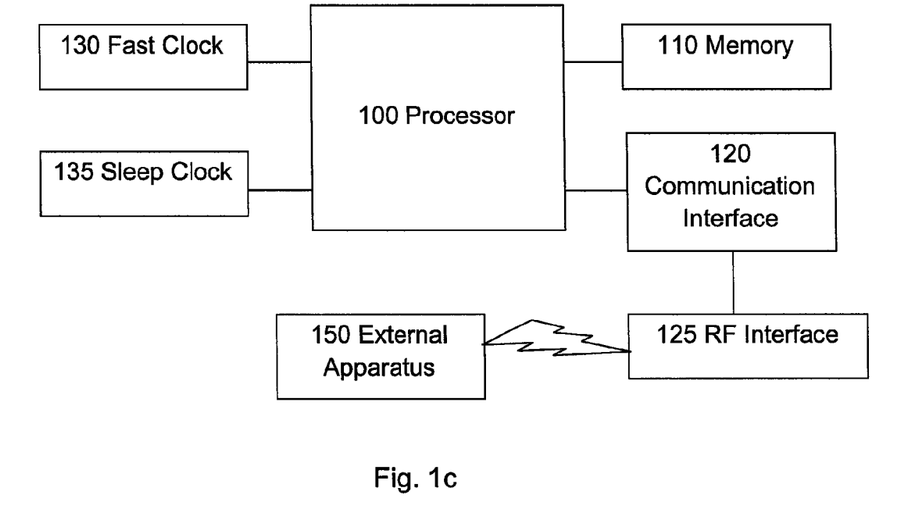
FIG. 1c shows a block diagram illustrating schematically an example of an apparatus according to embodiments discussed herein.

FIG. 1c shows a block diagram illustrating schematically another example of an apparatus according to an embodiment. In one embodiment, the apparatus comprises a base station or a Node-B. The apparatus comprises at least one controller 100, such as a processor, a memory 110 and a communication interface 120. In memory 110, computer instructions are stored which are adapted to be executed on the processor 100. The communication interface 120 is adapted to receive and send information to and from the processor 100. The communication interface 120 further comprises a radio frequency interface 125 for communicating with other apparatus 150. In one specific example, the radio frequency interface 125 may set up communication between: a base station and a UE, two base stations, or a base station and an upper level of a communications system network. The apparatus is adapted to operate using a fast clock 130 in an active mode and to operate using a slower sleep clock 135 in a power-saving mode, again including for example sleep modes, deep sleep modes, idle modes, discontinuous reception modes and discontinuous transmission modes.

In one embodiment, an apparatus according to the above is adapted to be part of a radio network. The network may be a GSM-Edge (Global System for Mobile Communications Enhanced Data Rates for Global Evolution) Radio Access Network (GERAN). The network may also be any cellular radio access network such as, for example, a UMTS (Universal Mobile Telecommunications System) Terrestrial Radio Access Network (UTRAN) or an E-UTRAN (evolved UTRAN). Such a system comprises a number of base stations each handling a cell. At least one UE is part of a cell and is handled or served by the cell's base station. A UE may be mobile and is thus able to move between cells.

In one embodiment, an apparatus comprises a controller and one or more hardware components. The controller is connected to a fast clock and a sleep clock and the apparatus is adapted to operate using the fast clock in an awake mode, and the sleep clock in a power-saving mode. During the power-saving or sleep mode, a fast clock is gated or inactivated to save energy, and the sleep clock is used to provide the timing for one or more hardware components. To calibrate the sleep clock to allow drift in the sleep clock to be corrected, the ratio between the fast clock's cycle count and the sleep clock's cycle count is calculated.

Figure 2:
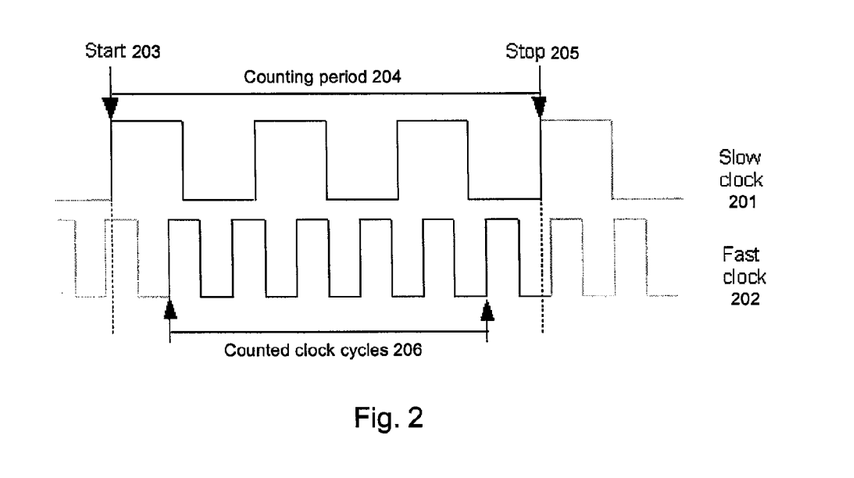
FIG. 2 shows a schematic view of an example of the clock cycles of a fast clock and of a sleep clock according to embodiments discussed herein; and, FIG. 3 shows a flowchart illustrating schematically examples of methods according to embodiments discussed herein.

There are a number of errors that can affect the quality of the calibration. One such error occurs because the fast and slow clock pulses may not be synchronised when calibration measurements begin. FIG. 2 compares the sleep clock cycles 201 to the fast clock cycles 202. As noted above, the sleep clock 201 may be several orders of magnitude slower than the fast clock 202, so in fact there may be very many fast clock cycles for each slow clock cycle.

At a start time 203, the controller starts counting clock cycles of the two clocks during a counting period 204 until a stop time 205. In this example, a clock cycle is counted on the rising edge of a clock signal, though a clock cycle may be detected in other ways, such as by detecting a falling edge of a clock signal. The duration of the counting period 204 of the sleep clock cycles 201 is the calibration time Tcal (in seconds). Since the start of the fast clock and sleep clock pulses may not be synchronised at the start of the calibration period Tcal, the fast clock pulses may not be counted immediately after the start of Tcal, meaning that the number of fast clock cycles counted 206 over the calibration period 204 is more or less than the expected or "correct" number of fast clock cycles, particularly if there is a large amount of jitter in the sleep clock. In one specific example, particularly where there is little or no jitter in the sleep clock, this calibration error may be only ±1 clock cycles for each calibration measurement. However, the calibration error may be different in other cases. For example, it may be larger than a single clock cycle if the width of the jitter of the sleep clock is greater than the pulse width of the fast clock.

The total impact of this calibration phase error for one measurement period is determined by how long the measurement is, and also by the duration of the period after the measurement until the next measurement. Longer measurements have relatively less phase error than shorter ones, and a shorter time between measurements causes less total phase error. For the case where the calibration phase error is ±1 clock cycles for each calibration measurement, the maximum impact of the calibration phase error for one measurement can be given by:

$$|Ep| = Tsleep/Tcal \quad \text{(Eqn. 1)}$$

where Ep is the total phase error (in fast clock cycles), Tsleep is the time (in seconds) that the fast clock is not running (i.e. typically when the device is in a power-saving mode), which is typically the time between measurement periods, and Tcal is the duration of the calibration measurement (in seconds).

As can be seen, the longer the calibration period Tcal, the smaller the error Ep. However, excessively long calibration periods are not practical, because they require a comparatively large amount of energy, increasing the overall average power consumption of the device. It can also be seen that if the time Tsleep between two measurements is shorter, the total phase error Ep is reduced. As just one practical example only, Tsleep=5.12 s and Tcal=24 ms, and thus the total calibration phase error would be ±213 fast clock cycles as a maximum.

It is the aim of some prior art to minimise Ep by performing a new calibration every time the apparatus is awake (this minimises Tsleep). However, if the wakeup period on a particular occasion is short (causing Tcal to be small), the new calibration might have a phase error that is higher than that of a previous calibration and a good calibration may therefore be discarded in favour of a worse calibration.

In examples of embodiments of the present invention, the controller is configured to perform the calibration during the entire or a majority of the wakeup period. This is in order to minimise the calibration phase error.

In addition, as mentioned above, when the apparatus is in sleep mode, the slow clock can drift from its nominal frequency, and the longer the apparatus is in sleep mode, the more the frequency can drift. Moreover, temperature changes in the apparatus can cause the sleep clock's frequency to drift by varying amounts. The total frequency drift caused by the temperature depends on the duration of time that the fast clock is not running (i.e. the duration of time that the device is in a sleep mode using the slow clock). The temperature induced frequency drift error Etemp (measured in fast clock cycles per second) can be estimated, for example by taking measurements of sleep clock error at different apparatus temperatures when the device is manufactured.

Figure 3A:
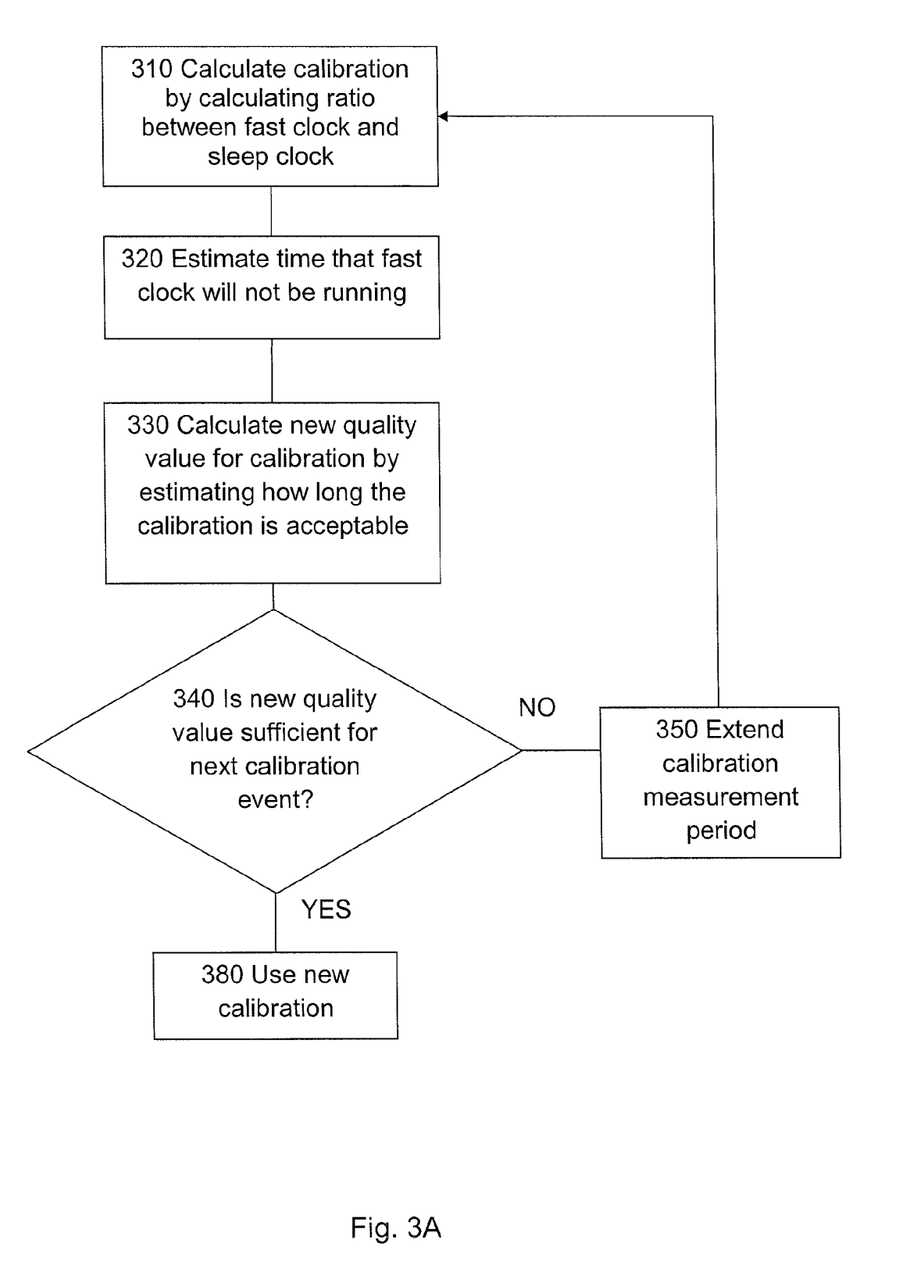

FIG. 3A shows schematically an example of an embodiment of the present invention in which a controller is configured to calculate 310 a calibration value for a sleep clock based on a fast clock (for example whilst in a wakeup mode) and then determine 330 a quality value for this calibration. It is then determined 340 whether the new quality value is sufficient to last until the next calibration event. If not, the calibration measurement period is extended 350.

In one embodiment, the controller is configured to calculate the quality of a calibration by estimating the length of time before a calibration becomes unacceptable 330. The acceptability of a calibration depends on a maximum allowed error before a new calibration must be calculated, Emax. As a particular example, Emax is specified by EUTRAN as ±5.6 µs per calibration. For a fast clock running at 40 MHz, for example, this corresponds to a maximum allowed error of ±224 fast clock cycles.

In a specific example, the controller is configured to estimate the quality value of a calibration, Qcal, as the length of time a calibration will be acceptable by calculating:

$$Qcal = (E \times Tcal)/Ep \quad \text{(Eqn. 2)}$$

where Qcal is the quality value (in seconds), E is the error allowed before a new calibration must be calculated (which is related to the maximum allowed error Emax), Tcal is the duration of the calibration measurement (in seconds) and Ep is the calibration phase error.

In one embodiment, the controller estimates the time until the next calibration by estimating 320 the time, Tsleep, that the fast clock will not be running (i.e. the duration of time that the device is in a power-saving mode). In one embodiment, the controller is configured to estimate 320 Tsleep based on the previous estimated time that the fast clock was not running (Tprev) and the previous actual time that the fast clock was not running (Treal). In a specific example, the controller is configured to estimate Tsleep through:

$$Tsleep = ((n-1)Tprev + Treal)/n \quad \text{(Eqn. 3)}$$

where n is the gain value of Treal and is set to a fixed value by the software. In embodiments, the gain value may be in the range 1 to 20, or in the range 5 to 15, or equal to 10 in a particular example.

In one embodiment, the controller is configured to determine whether Tprev was estimated to be too short, i.e. Tprev<Treal. In such a case, Tsleep is set to the previous real time that the fast clock was not running, i.e. Tsleep=Treal. This is done to prevent repeated estimation failures if the length of time the device typically spends in a power-saving mode suddenly jumps from short durations to long durations. An example of such may be if the DRX (Discontinuous Reception) period changes from 640 ms to 5120 ms (such as for "extended DRX").

As mentioned, the controller is configured to determine 340 whether the quality value of a calibration is sufficient to last until the next calibration event. In one embodiment, this is achieved by first determining the quality of a calibration as a time when a next calibration is to be performed (Qt), i.e. a time when the calibration is no longer acceptable, through:

$$Qt = T + Qcal \quad \text{(Eqn. 4)}$$

where T is the time at which the calibration was calculated with respect to some arbitrary start time which occurred before the old calibration was calculated. The controller then checks that the time at which the calibration is no longer acceptable (Qt) is later than the next predicted calibration event. If the quality value is not sufficient, the controller is configured to extend 350 the calibration measurement period Tcal to increase Qcal, and thus Qt (see Eqn. 2). The controller is further configured to extend the awake time of the apparatus to enable a longer measurement period if necessary. These steps may in principle be repeated until a calibration is of sufficient quality to last until the next calibration event.

In an embodiment, the controller may be configured to force a new calibration to be carried out if the current calibration becomes unacceptable. The controller may determine this, for example, by comparing the time at which the calibration is no longer acceptable (Qt) with the current time (where the current time and Qt are both times that begin at the same arbitrary start point, and are thus comparable). If the current time has surpassed the calibration's acceptability time, a new calibration is forced.

Figure 3B:
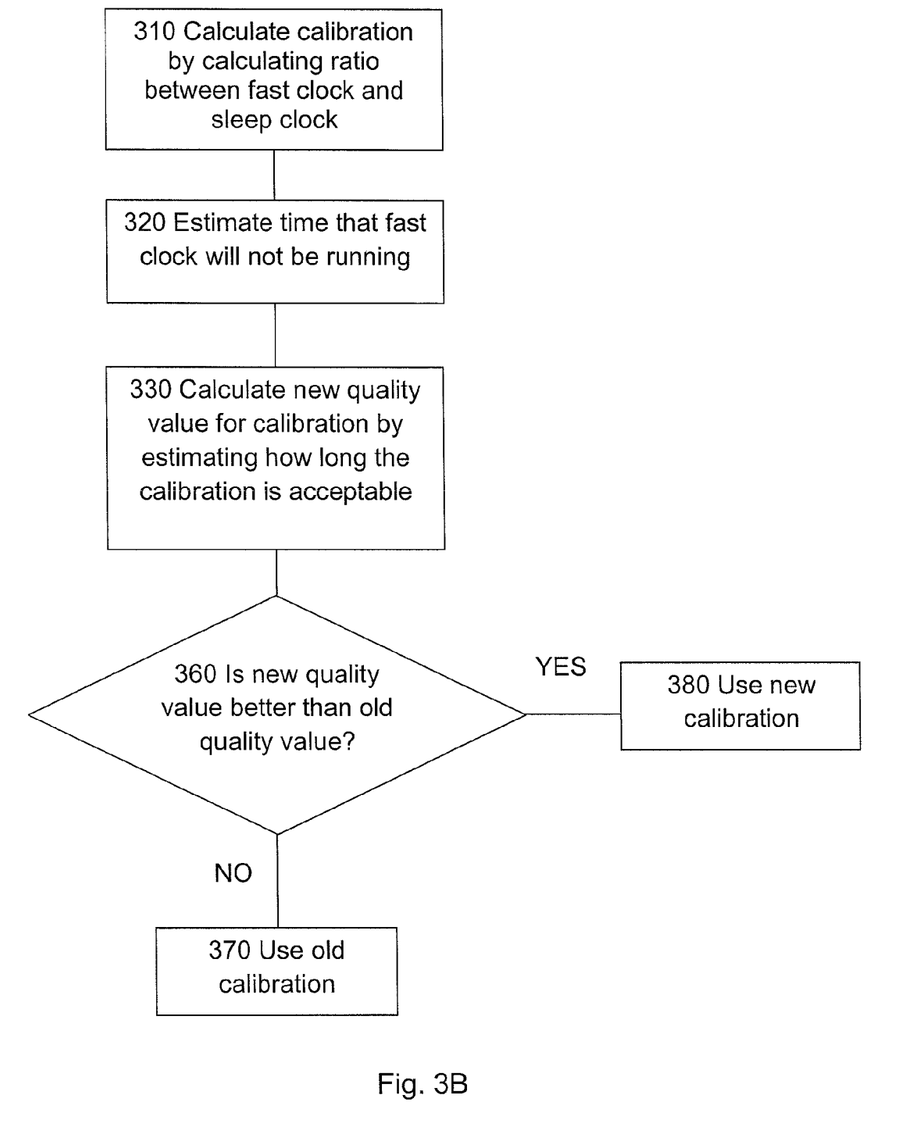

FIG. 3B shows an alternative example, in which a controller is again configured initially to calculate 310 a calibration value for a sleep clock based on a fast clock (for example whilst in a wakeup mode) and then determine 330 a quality value for this calibration. The quality value for this calibration in this example may again be based on the controller estimating the time until the next calibration by estimating 320 the time, Tsleep, that the fast clock will not be running (i.e. the duration of time that the device is in a power-saving mode). The controller is configured then to compare 360 the quality value Qnew of a new calibration with the quality value Qold of an old or previous calibration. If the controller finds that the quality value of the old calibration is still higher than the quality value of the new calibration, i.e. Qold>Qnew, then the new calibration is discarded 370. If Qold<Qnew, the new calibration is used 380. This prevents a good calibration being discarded in favour of a recently made bad calibration.

In a specific example, in which the quality value represents the length of time that a calibration will be valid or acceptable (i.e. Qcal), a first or old calibration may be estimated to be acceptable for T1 seconds and a second or new calibration may be estimated to be acceptable for T2 seconds. A controller is configured to determine whether T2 is larger than T1−Tp, where Tp is the time that has passed since the last calibration, and, if so, the controller is configured to use the second calibration. In one embodiment, the controller also resets Tp.

In a specific example, in which the controller estimates the quality value as the time when a next calibration is to be performed (Qt), the controller may be configured to determine whether an old or new calibration is better by comparing the quality values Qt of the two calibrations to establish which will remain acceptable for the longer time. The better calibration is then used. For example, at time T=1000 ms a calibration might be made having Qcal=3405 ms, giving a new Qt of 4405 ms. If the old Qt=4575 ms, then the new Qt is lower and will be discarded.

In another alternative embodiment, the controller may be configured effectively to carry out a combination of the two examples discussed above and shown schematically in FIG. 3A and FIG. 3B. As one particular example, the quality values of the new and old calibrations may first be compared 360 to establish which has the higher quality. Following this, the calibration with the highest quality value (whether the "old" or the "new") is effectively selected and then compared to the time that the fast clock will not be running (Tsleep) to establish whether this calibration is sufficient to last until the next calibration event 340. If this calibration is sufficient, it may be used "as is". Else, if this calibration is found not to be sufficient, the calibration measurement period may be extended 350.

As another example, the controller may be configured to first compare the quality value of a new calibration to Tsleep to establish whether it is sufficient to last until the next calibration event 340. If the quality of the new calibration is not sufficient, then the calibration measurement period may be extended 350. If the quality of the new calibration is sufficient, or the quality of the extended new calibration is sufficient, the quality value of the (possibly extended) new calibration may be compared to the quality value of the old calibration 360, and the calibration with the highest quality used.

As a further optional addition to the present embodiment, the estimated time that the fast clock will not be running (Tsleep) is compared to both the old and the new quality values, and if neither of these values is long enough, an extended calibration is executed. If at least one of the old and new calibrations is good enough, their quality values are compared and the one with the highest quality is used.

These various alternative embodiments thus allow for a controller to determine whether an older calibration is still more efficient than a more recent calibration, thereby preventing a good calibration being discarded in favour of a recently made bad calibration. It is also ensured that a calibration does not continue to be used once its acceptability has expired.

In general, the frequency of the slow clock is always drifting, and the amount of drift depends on the length of time between frequency calibrations. However, since the durations of the calibration measurement periods are typically much shorter than the periods when the fast clock is not running (for example, Tsleep may be 5.12 s and Tcal may be 24 ms), the slow clock frequency drift during the calibration can be neglected, and as a good approximation it can be said that the frequency drift depends on the length of time that the fast clock is not running.

In general, the amount of frequency drift varies with temperature. This temperature-related frequency drift is referred to as Etemp herein (in fast clock cycles per second). In an example of the present embodiment, the controller is configured to calculate the allowed error (in fast clock cycles) through:

$$E = E\max - (E\text{temp} \times T\text{sleep}) \quad \text{(Eqn. 5)}$$

where Emax is the maximum allowed error (for example, as specified by EUTRAN). Referring to Equation 2, the controller in this case may calculate 330 the quality value of a calibration Qcal (in seconds) through:

$$Q\text{cal} = ((E\max - (E\text{temp} \times T\text{sleep})) \times T\text{cal}) / Ep \quad \text{(Eqn. 6)}$$

where (Etemp×Tsleep) gives the overall error incurred (in fast clock cycles) due to frequency drift during the time period Tsleep. In this way, it is possible to account for both the temperature drift of the sleep clock and the calibration phase error when estimating the quality of a calibration.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for use in a wireless network, the apparatus being associated with a fast clock for operation in an active wakeup mode and a sleep clock for operation in a sleep mode, the sleep clock having a current calibration and being periodically recalibrated, the apparatus comprising at least one controller configured to:
   calculate a new calibration for the sleep clock based on the fast clock, the new calibration being calculated during a calibration measurement period; then
   determine a quality value for the calculated new calibration for the sleep clock, wherein the quality value comprises the length of time that a calibration will remain acceptable;
   estimate a length of time from the time of the new calibration until the next calibration for the sleep clock; and
   determine whether the calculated new calibration is of sufficient quality to last for the estimated length of time from the time of the new calibration until the next calibration, and
   when the calculated new calibration is determined not to be of sufficient quality to last until the next calibration, extending the calibration measurement period, then
      calculating another calibration for the sleep clock based on the fast clock during the extended calibration measurement period, and then
      repeating the quality value determination using the calculated another calibration, the length of time estimation and the quality determination using the calculated, another calibration.

2. The apparatus according to claim 1, the controller being further configured to determine whether the quality value of the calculated new calibration is higher than the quality value of the current calibration and,
   if so, use the calculated new calibration and,
   if not, discard the calculated new calibration and continue use of the current calibration.

3. The apparatus according to claim 1, wherein the controller is further configured to calculate the quality value of a calibration by estimating how long the calibration is valid.

4. The apparatus according to claim 3, wherein the controller is further configured to estimate how long a calibration will be valid based on an error allowed before a new calibration must be made and a length of the calibration measurement period.

5. The apparatus according to claim 3, wherein the controller is further configured to estimate how long a calibration will be valid based on an error caused by temperature drift and an estimate of a length of time that the fast clock will not be running.

6. The apparatus according to claim 1, wherein the controller is further configured to force a new calibration to be carried out if the current time equals or is larger than the time when the current calibration is no longer acceptable.

7. A method for use in a network apparatus associated with a fast clock for operation in an active wakeup mode and a sleep clock for operation in an sleep mode, the sleep clock having a current calibration and being periodically recalibrated, the method comprising:
   calculating a new calibration for the sleep clock based on the fast clock, the new calibration being calculated during a calibration measurement period; then
   determining a quality value for the calculated new calibration for the sleep clock, wherein the quality value comprises the length of time that a calibration will remain acceptable;
   estimating a length of time from the time of the new calibration until the next calibration for the sleep clock;
   determining whether the calculated new calibration is of sufficient quality to last for the estimated length of time from the time of the new calibration until the next calibration, and
   when the calculated new calibration is determined not to be of sufficient quality to last until the next calibration, extending the calibration measurement period, then
      calculating another calibration for the sleep clock based on the fast clock during the extended calibration measurement period, and then
      repeating the quality value determination step using the calculated another calibration, the length of time estimation step and the quality determination step using the calculated another calibration.

8. The method according to claim 7, comprising:
   determining whether the quality value of the calculated new calibration is higher than the quality value of the current calibration; and
   if so, using the calculated, new calibration and,
   if not, discarding the new calibration and continuing to use the current calibration.

9. The method according to claim 7, wherein the quality value of a calibration is determined by estimating how long the calibration is valid.

10. The method according to claim 9, further comprising estimating how long a calibration will be valid based on an error allowed before a new calibration must be made and a length of the calibration measurement period.

11. The method according to claim 9, further comprising:
    estimating how long a calibration will be valid based on an error caused by temperature drift and an estimate of the length of time that the fast clock will not be running.

12. The method according to claim 7, further comprising forcing a new calibration to be carried out if the current time equals or is larger than the time when the current calibration is no longer acceptable.

13. An apparatus for use in a wireless network, the apparatus being associated with a fast clock for operation in an active wakeup mode and a sleep clock for operation in a sleep mode, the sleep clock having a current calibration and being periodically recalibrated, the apparatus comprising at least one controller configured to:
    calculate a new calibration for the sleep clock based on the fast clock, the new calibration being calculated during a calibration measurement period; then
    determine a quality value for the calculated new calibration by estimating how long the calibration is valid, wherein the quality value comprises the length of time that a calibration will remain acceptable;
    when the calculated new calibration is determined not to be of sufficient quality to last until the next calibration, extending the calibration measurement period, then
       calculating another calibration for the sleep clock based on the fast clock during the extended calibration measurement period;
    determine whether the quality value of the calculated new calibration is higher than a quality value of the current calibration; and, if so, use the calculated new calibration and, if not, discard the new calibration and continue to use the current calibration.

14. The apparatus according to claim 13, wherein the controller is further configured to estimate how long a calibration will be valid based on an error allowed before a new calibration must be made and a length of the calibration measurement period.

15. The apparatus according to claim 14, wherein the controller is further configured to estimate how long a calibration will be valid based on an error caused by temperature drift and an estimate of a length of time that the fast clock will not be running.

16. The apparatus according to claim 13, wherein the controller is further configured to force a new calibration to be carried out if the current time equals or is larger than the time when the current calibration is no longer valid.

17. A method for use in a network apparatus associated with a fast clock for operation in an active wakeup mode and a sleep clock for operation in a sleep mode, the sleep clock having a current calibration and being periodically recalibrated, the method comprising:

calculating a new calibration for the sleep clock based on the fast clock, the new calibration being calculated during a calibration measurement period; then determining a quality value for the calculated new calibration by estimating how long the calibration is valid, wherein the quality value comprises the length of time that a calibration will remain acceptable;

when the calculated new calibration is determined not to be of sufficient quality to last until the next calibration, extending the calibration measurement period, then calculating another calibration for the sleep clock based on the fast clock during the extended calibration measurement period;

determining whether the quality value of the calculated new calibration is higher than a quality value of the current calibration; and, if so, using the new calibration and, if not, discarding the new calibration and continuing to use the current calibration.

18. The method according to claim 17, further comprising estimating how long a calibration will be valid based on an error allowed before a new calibration must be made and a length of the calibration measurement period.

19. The method according to claim 17, further comprising:

estimating how long a calibration will be valid based on an error caused by temperature drift and an estimate of a length of time that the fast clock will not be running.

20. The method according to claim 17, further comprising forcing a new calibration to be carried out if the current time equals or is larger than the time when the current calibration is no longer valid.

* * * * *